(12) United States Patent
Adiprasito et al.

(10) Patent No.: US 10,597,079 B2
(45) Date of Patent: Mar. 24, 2020

(54) NARROW-PASSAGE ASSISTANCE SYSTEM IN A MOTOR VEHICLE

(71) Applicant: Bayerische Motoren Werke Aktiengesellschaft, Munich (DE)

(72) Inventors: Bartono Adiprasito, Tiefenbach (DE); Helena Mussner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 151 days.

(21) Appl. No.: 15/852,329

(22) Filed: Dec. 22, 2017

(65) Prior Publication Data
US 2018/0118264 A1 May 3, 2018

Related U.S. Application Data

(63) Continuation of application No. PCT/EP2016/063915, filed on Jun. 16, 2016.

(30) Foreign Application Priority Data

Jun. 24, 2015 (DE) .......................... 10 2015 211 736

(51) Int. Cl.
*B62D 15/02* (2006.01)
*B60W 30/10* (2006.01)
(Continued)

(52) U.S. Cl.
CPC ........... *B62D 15/026* (2013.01); *B60W 30/10* (2013.01); *B60W 30/16* (2013.01); *B62D 15/025* (2013.01);
(Continued)

(58) Field of Classification Search
CPC ......................... B62D 15/026; B62D 15/0265; B62D 15/025; B60W 30/10; B60W 30/16;
(Continued)

(56) References Cited

U.S. PATENT DOCUMENTS 7,765,066 B2 * 7/2010 Braeuchle ........... B60W 30/095
382/103
2010/0324797 A1 12/2010 Fritz
(Continued)

FOREIGN PATENT DOCUMENTS

| DE | 10 2007 027 495 A1 | 12/2008 |
| DE | 10 2010 012 954 A1 | 9/2011 |
| DE | 10 2011 077 975 A1 | 12/2012 |
| DE | 10 2013 010 721 A1 | 12/2013 |
| EP | 2 238 006 B1 | 3/2013 |

OTHER PUBLICATIONS

International Search Report (PCT/ISA/210) issued in PCT Application No. PCT/EP2016/063915 dated Sep. 16, 2016 with English translation (five pages).
(Continued)

*Primary Examiner* — Michael J Zanelli
(74) *Attorney, Agent, or Firm* — Crowell & Moring LLP

(57) ABSTRACT

A narrow-passage assistance system is provided for a motor vehicle having at least one electronic control unit, which detects a narrow passage in the form of the presence of two objects that restrict the ego-vehicle on both sides in accordance with signals of various sensors known per se for sensing lateral obstacles and which controls transverse positioning of the ego-vehicle between the two objects by at least one transversely-guiding actuator. The control unit contains a transverse guidance module, which is designed such that the transverse guidance module can distinguish between dynamic and static objects. If a static object is detected on one side of the ego-vehicle and a dynamic object is detected on the other side of the ego-vehicle, transverse positioning of the ego-vehicle closer to the static object is performed if necessary. The transverse guidance module is also designed such that the transverse guidance module distinguishes between soft and hard objects. If a hard object is detected on one side and a soft object is detected on the other side, (Continued)

transverse positioning of the ego-vehicle closer to the soft object is performed.

10 Claims, 1 Drawing Sheet

(51) Int. Cl.
*B60W 30/16* (2020.01)
*B60W 50/00* (2006.01)

(52) U.S. Cl.
CPC . *B62D 15/0265* (2013.01); *B60W 2050/0094* (2013.01); *B60W 2550/10* (2013.01); *B60W 2550/308* (2013.01)

(58) Field of Classification Search
CPC ....... B60W 2550/10; B60W 2550/308; B60W 2050/0094
See application file for complete search history.

(56) References Cited

U.S. PATENT DOCUMENTS

| | | |
|---|---|---|
| 2013/0197758 A1 | 8/2013 | Ueda et al. |
| 2014/0172221 A1* | 6/2014 | Solyom .............. B62D 15/0285 701/23 |
| 2015/0088360 A1 | 3/2015 | Bonnet et al. |
| 2015/0175159 A1* | 6/2015 | Gussner ............. B62D 15/0265 701/1 |

OTHER PUBLICATIONS

German-language Written Opinion (PCT/ISA/237) issued in PCT Application No. PCT/EP2016/063915 dated Sep. 16, 2016 (five pages).

German-language Search Report issued in counterpart German Application No. 10 2015 211 736.7 dated Mar. 10, 2016 with partial English translation (13 pages).

* cited by examiner

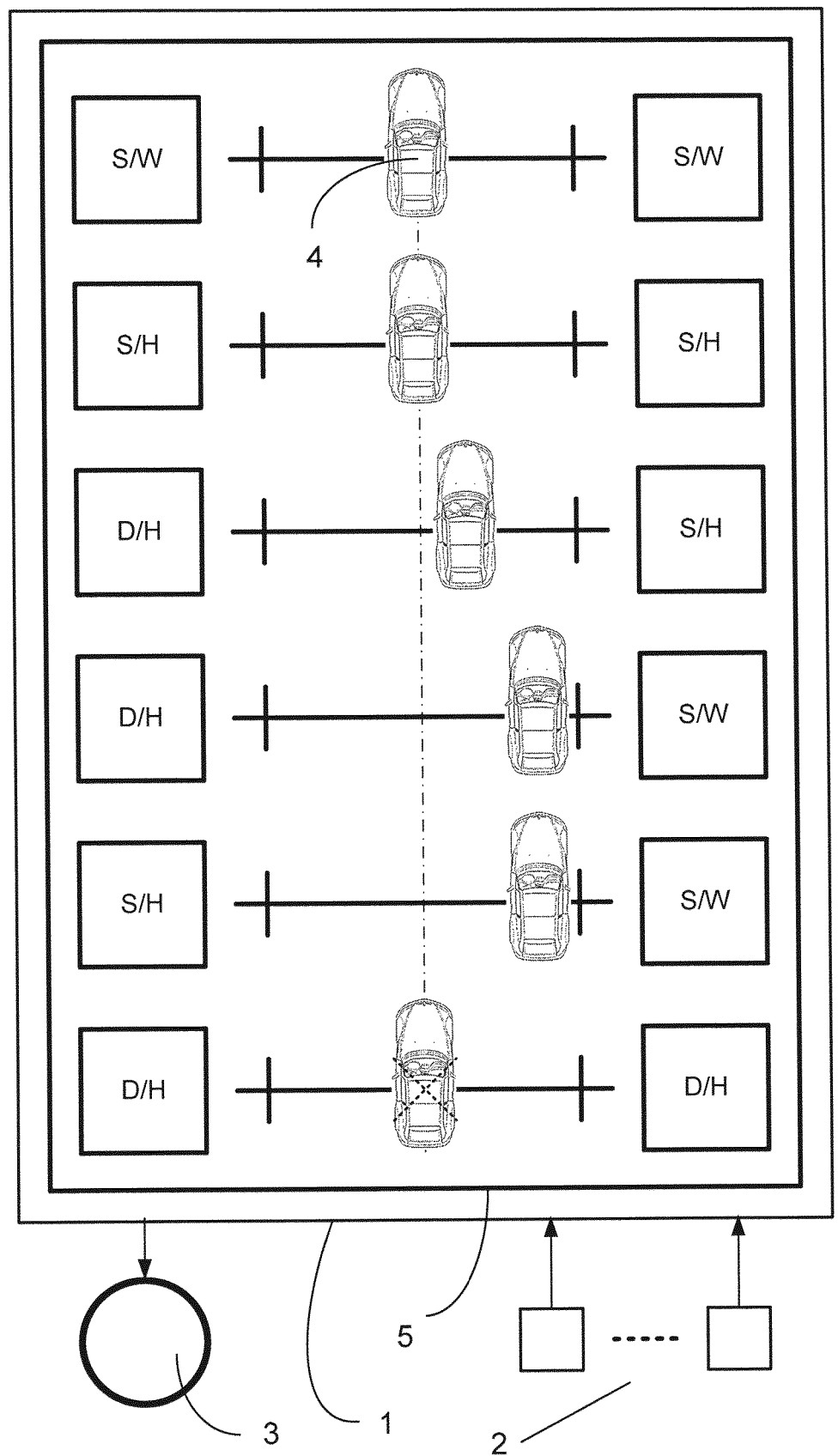

NARROW-PASSAGE ASSISTANCE SYSTEM IN A MOTOR VEHICLE

CROSS REFERENCE TO RELATED APPLICATIONS

This application is a continuation of PCT International Application No. PCT/EP2016/063915, filed Jun. 16, 2016, which claims priority under 35 U.S.C. § 119 from German Patent Application No. 10 2015 211 736.7, filed Jun. 24, 2015, the entire disclosures of which are herein expressly incorporated by reference.

BACKGROUND AND SUMMARY OF THE INVENTION

The invention relates to a narrow-passage assistance system in a motor vehicle.

The Applicant has already developed a prototype of what is known as a narrow-passage assistant, which predictively measures a narrow passage and notifies the driver of whether said narrow passage is sufficiently wide to drive the ego vehicle through. The narrow-passage assistance system developed by the Applicant hitherto is meant to help the driver to assess narrow passages correctly, for example in freeway driving, and to precisely hold the course on passing through. To measure a narrow passage, the electronics use suitable sensors (e.g. laser scanner, radar and/or camera) to look onwards and use further sensors (e.g. radars and/or ultrasonic sensors) to estimate the lateral distance from obstacles such as guard rails or other vehicles.

In everyday traffic, the narrow-passage assistant can be used in freeway roadworks, for example, where two lanes arranged parallel to one another can be used in a manner established for the traffic in one direction, but only under a high level of strain on account of their reduced width. One particular challenge in this context is especially overtaking maneuvers. The narrow-passage assistant assists the driver by indicating when the system identifies that passing a truck travelling in the right-hand lane may be risky. If the space remaining in his lane is insufficient to complete the maneuver without risk, the driver is informed of this at an early stage. If the lane is sufficiently wide, the driver is also provided with pointers during the overtaking process that allow him to keep the ideal distance on both sides. E.g. it is possible for displays to provide information about the distance present on both sides in the head-up display. As soon as the distance from the guard rail or from the vehicle in the parallel lane drops below a defined measure, a short steering impulse is additionally provided. If the driver complies with this, his vehicle returns to the optimum course.

One specific function of a narrow-passage assistant is also known from DE 10 2011 077 975 A1, for example. In this case, a distance-based speed-of-travel control system and a narrow-passage assistance system are coupled in a motor vehicle such that in the activated state the narrow-passage assistance system influences the operation of the distance-based speed-of-travel control system.

It is an object of the invention to expand the areas of use of a narrow-passage assistance system and to develop them to attain a further increase in safety and comfort.

This and other objects are achieved according to the invention by a narrow-passage assistance system in accordance with embodiments of the invention.

The narrow-passage assistance system according to the invention for a motor vehicle (ego vehicle) has at least one electronic control unit that receives the signals from different sensors known per se (radar, video, ultrasonic, laser, etc.) for sensing lateral obstacles as a basis for identifying a narrow passage in the form of the presence of two objects constricting the ego vehicle on both sides, and uses at least one transverse actuator (particularly an active steering apparatus) to control transverse positioning of the ego vehicle between the two objects. In this case, both steering assistance and automatic steering are supposed to be covered. The control unit includes a transverse guidance module, particularly in the form of a software program, that is configured such that it can distinguish between dynamic and static objects. If an object, such as particularly a vehicle travelling in a neighboring lane, moves, it is classified as a dynamic object. By way of example, identified lane boundary lines, guard rails or tunnel walls are classified as static objects. When a static object is identified on one side and a dynamic object is identified on the other side of the ego vehicle, transverse positioning of the ego vehicle closer to the static object is performed if needed.

Preferably, the transverse guidance module is additionally configured such that a distinction is drawn between soft and hard objects. In this case, dynamic objects are preferably always classified as hard objects. In the case of static objects, rigid guard rails or tunnel walls, in particular, are classified as hard objects and lane boundary lines that could be crossed if need be, in particular, are classified as soft objects. When a hard object is identified on one side and a soft object is identified on the other side, transverse positioning of the ego vehicle closer to the soft object is performed according to the invention.

The invention is based on the following considerations, insights and ideas.

The invention relates to the control of a narrow-passage assistant as an expansion of the lane departure warning system. The lane departure warning system senses the road ahead of the vehicle and the markings of said road using a camera on the mirror in the windshield. The camera is used to record the lane markings in order to use a controller to sense the current position of the vehicle. If the driver unintentionally crosses the lines, the system provides a warning.

Narrow-passage assistants sense the course of the road by means of different sensors, such as cameras, laser scanners, radar or ultrasonic sensors, for example. Lateral obstacles, such as other vehicles or guard rails, for example, and the distance thereof from the ego vehicle are recorded. Hence the driver can have optimum positioning of his vehicle pointed out, for example, in the head-up display. In addition, a clear warning can be given or the steering can be actively influenced in the case of danger.

Systems to date do not actively distinguish between different types of objects. As such, there is no distinction drawn between whether a static lateral boundary or a dynamic other vehicle is involved. This firstly results in the safety buffer that the driver naturally observes in relation to a dynamic object not being observed. Moving objects change their transverse position in the lane, which means that their behavior is not foreseeable.

In addition, a distinction is not drawn in regard to what characteristic (in particular "hard" or "soft") of an object is involved. "Hard" objects, such as other vehicles or guard rails, must not be touched and a certain safety distance needs to be observed in this case too. "Soft" objects, such as e.g. road lines, can be crossed by the driver in the case of danger.

According to the invention, the control of the narrow-passage assistant is intended to provide control on the basis of at least one dynamic object, such as another road user, and/or a static object, such as e.g. a guard rail. In this case, primarily the static object, such as a guard rail or a tunnel wall, for example, is intended to be used for the lateral orientation of the system.

If there is a narrow passage, for example in front of the vehicle, between a guard rail (static object) and a truck (dynamic object), then the natural approach of the driver would be to drive somewhat closer to the static guard rail and to keep a (greater) safety distance from the dynamic truck. This natural "evasive process" is carried out automatically, according to the invention, by the narrow-passage assistant. In this case, the system thus orients itself in the narrow passage not with respect to the truck, the dynamic object, but rather primarily with respect to the guard rail, that is to say the static object.

In addition, the narrow-passage assistant according to the invention is intended to distinguish between different characteristics of objects, particularly of the static objects, and accordingly to be able to control the transverse position. Such characteristics are particularly, as already mentioned above, not only static or dynamic objects, but also whether these are "hard" or "soft". Hard objects or boundaries are guard rails, walls or vehicles, which can cause corresponding damage in the event of contact. Soft objects or boundaries are road markings (e.g. line markings), for example, for which approaching or crossing them does not signify a fundamental danger.

If the vehicle is between two static hard boundaries, such as a single-lane tunnel, the narrow-passage assistant orients itself to the center of the road. If the vehicle now travels between a static hard tunnel wall and a dynamic hard truck, on the other hand, it is accordingly steered closer to the tunnel wall. The course of the wall can be easily predicted in this case, whereas the travelling truck vacillates in its lane. This vacillation of the other vehicle is absorbed by admittedly taking the identified existence of the dynamic object as a basis for determining a transverse positioning that is closer to the static object. The implemented trajectory on which the ego vehicle moves later on is predominantly oriented to the course of the static object, however. If the system nevertheless registers a future collision point, it can directly ask the driver to take over.

In addition, in the case of a dynamic hard truck and a static soft road marking, the vehicle is intended to approach the marking even closer.

The distinctions between static and dynamic, on the one hand, and hard or soft, on the other hand, allow the system to further approximate the natural driving behavior of a human being. This increases the feeling of comfort for the driver and his confidence in the system, since the actions that can now be taken are consistent with his natural actions. The increased buffer with respect to dynamic objects, that is to say the primary control on the basis of static objects, means that it is not necessary to adjust for any vacillatory movements by the vehicles. As a result, it is possible to further increase the comfort for the driver. In addition, there is a distinct increase in safety for the driver, the vehicle occupants and other road users. The assistance for setting the correspondingly optimum lateral distances allows critical situations and hence collisions to be distinctly reduced. Further, the system thus prevents respective misjudgments by the driver about the width of his own and also the other vehicle. Further, a crucial advantage is that the position finding for dynamic lateral objects does not have to be effected with a high level of accuracy, since the positioning of the ego vehicle is largely decoupled from the ascertained movement of the lateral object. In addition, as an expansion, the system resorts to the previous hardware in the vehicle. It is therefore possible to distinctly increase the safety and comfort of the driver by means of cost effective and hence economic adaptation of the control.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE depicts an exemplary embodiment of the invention. It shows an overview of the fundamental control response of the narrow-passage assistance system according to the invention in respect of the possible combinations between dynamic and static objects (or lateral boundaries), on the one hand, and hard and soft objects, on the other hand.

DETAILED DESCRIPTION OF THE DRAWING

The single FIGURE schematically depicts an electronic control unit 1, which may be an inherently known transverse driver assistance system, for example, having a transverse guidance module 5 according to the invention. The control unit 1 receives the signals from various inherently known sensors 2 for sensing lateral obstacles and, from those, for identifying dynamic and static and also soft and hard objects that can form a narrow passage. Further, the control unit 1 directly or indirectly activates an active steering apparatus 3 for transverse positioning of the ego vehicle 4 on the basis of the rules and data stored in the transverse guidance module 5.

The transverse guidance module 5, in the form of an executable software function, prescribes the following control actions, which are explained with reference to the FIGURE in the order from top to bottom:

(1) when two static soft objects S/W are present on both sides of the ego vehicle 4, transverse positioning of the ego vehicle 4 centrally between the two objects takes place.

(2) when two static hard objects S/H are present on both sides of the ego vehicle 4, transverse positioning of the ego vehicle 4 likewise centrally between the two objects takes place.

(3) when a dynamic hard object D/H is present on one side and a static hard object S/H is present on the other side, transverse positioning of the ego vehicle 4 closer to the static hard object S/H than to the dynamic hard object D/H takes place, but nevertheless while observing a defined safety distance.

(4) when a dynamic hard object D/H is present on one side and a static soft object S/W is present on the other side of the ego vehicle 4, transverse positioning of the ego vehicle 4 closer to the static soft object S/W at a comparatively short to approximately zero safety distance takes place.

(5) when a static hard object S/H is present on one side and a static soft object S/W is present on the other side of the ego vehicle 4, transverse positioning of the ego vehicle 4 closer to the static soft object S/W at a comparatively short to approximately zero safety distance likewise takes place.

(6) when two dynamic hard objects D/H are present, one option is for transverse positioning of the ego vehicle 4 centrally between the two objects to take place. Alternatively, the driver is asked to take over the vehicle so as thereby to prevent uncomfortable vacillation between the dynamic objects.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A narrow-passage assistance system in an ego motor vehicle, comprising:
    at least one electronic control unit that receives signals from different sensors for sensing lateral obstacles as a basis for identifying a narrow passage in a form of a presence of two objects constricting the ego vehicle on both sides, and uses at least one transverse actuator to control transverse positioning of the ego vehicle between the objects, wherein
    the control unit includes a transverse guidance module such that a distinction is drawn between dynamic and static objects,
    when a static object is present on one side and a dynamic object is present on the other side of the ego vehicle, transverse positioning of the ego vehicle closer to the static object is performed,
    the transverse guidance module is additionally configured such that a distinction is drawn between soft and hard objects, and
    when a hard object is present on one side and a soft object is present on the other side, transverse positioning of the ego vehicle closer to the soft object is performed.

2. The narrow-passage assistance system as claimed in claim 1, wherein when a dynamic hard object is present on one side and a static hard object is present on the other side, transverse positioning of the ego vehicle closer to the static object is performed with a greater safety distance than when a dynamic hard object and a static soft object are present.

3. The narrow-passage assistance system as claimed in claim 1, wherein
    when a dynamic hard object or a static hard object is present on one side and a static soft object is present on the other side of the ego vehicle, transverse positioning of the ego vehicle closer to the static soft object at a comparatively short to approximately zero safety distance is performed.

4. The narrow-passage assistance system as claimed in claim 1, wherein
    when two static hard objects or two static soft objects are present, transverse positioning of the ego vehicle centrally between the two objects is performed.

5. The narrow-passage assistance system as claimed in claim 1, wherein
    when two dynamic hard objects are present, either transverse positioning of the ego vehicle centrally between the two objects is performed or a driver is requested to take over the ego vehicle.

6. A method of operating a narrow-passage assistance system in an ego vehicle, comprising:
    receiving, by an electronic control unit, signals from different sensors that sense lateral obstacles as a basis for identifying a narrow passage in a form of two objects being present that constrict the vehicle on both sides of the vehicle;
    when a static object is present on one side of the vehicle and a dynamic object is present on the other side of the vehicle, positioning, by the control unit having a transverse guidance module, the vehicle transversely closer to the static object;
    drawing a distinction, by the transverse guidance module, between soft and hard objects; and
    when a hard object is present on one side of the vehicle and a soft object is present on the other side of the vehicle, positioning the vehicle, by the control unit having the transverse guidance module, transversely closer to the soft object.

7. The method according to claim 6, wherein
    when a dynamic hard object is present on one side and a static hard object is present on the other side, transverse positioning of the ego vehicle closer to the static object is performed with a greater safety distance than when a dynamic hard object and a static soft object are present.

8. The method according to claim 6, wherein
    when a dynamic hard object or a static hard object is present on one side and a static soft object is present on the other side of the ego vehicle, transverse positioning of the ego vehicle closer to the static soft object at a comparatively short to approximately zero safety distance is performed.

9. The method according to claim 6, wherein
    when two static hard objects or two static soft objects are present, transverse positioning of the ego vehicle centrally between the two objects is performed.

10. The method according to claim 6, wherein
    when two dynamic hard objects are present, either transverse positioning of the ego vehicle centrally between the two objects is performed or a driver is requested to take over the ego vehicle.

* * * * *